United States Patent
Galdo et al.

(10) Patent No.: US 11,777,936 B2
(45) Date of Patent: Oct. 3, 2023

(54) FRIEND KEY SHARING

(71) Applicant: Apple Inc., Cupertino, CA (US)

(72) Inventors: Florian Galdo, Emerald Hills, CA (US); Stephanie R. Martin, San Jose, CA (US); Yannick L. Sierra, San Francisco, CA (US); Ivan Krstic, San Francisco, CA (US); Christopher A. Volkert, San Francisco, CA (US); Najeeb M. Abdulrahiman, Fremont, CA (US); Matthias Lerch, San Francisco, CA (US); Onur E. Tackin, Saratoga, CA (US); Kyle C. Brogle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 17/251,140

(22) PCT Filed: Jun. 7, 2019

(86) PCT No.: PCT/US2019/035937
§ 371 (c)(1),
(2) Date: Dec. 10, 2020

(87) PCT Pub. No.: WO2019/241047
PCT Pub. Date: Dec. 19, 2019

(65) Prior Publication Data
US 2021/0250355 A1    Aug. 12, 2021

Related U.S. Application Data

(60) Provisional application No. 62/689,824, filed on Jun. 25, 2018, provisional application No. 62/683,569, filed on Jun. 11, 2018.

(51) Int. Cl.
*H04L 9/40*     (2022.01)
*G06F 21/33*    (2013.01)
(Continued)

(52) U.S. Cl.
CPC ............ *H04L 63/10* (2013.01); *G06F 21/335* (2013.01); *H04L 9/0894* (2013.01);
(Continued)

(58) Field of Classification Search
None
See application file for complete search history.

(56) References Cited

U.S. PATENT DOCUMENTS 8,947,202 B2   2/2015   Tucker et al.
9,189,900 B1   11/2015  Penilla et al.
(Continued)

FOREIGN PATENT DOCUMENTS

WO    2018/160863    9/2018

OTHER PUBLICATIONS

International Search Report and Written Opinion in Appl. No. PCT/US2019/035937 dated Aug. 1, 2019, 14 pages.
(Continued)

*Primary Examiner* — Brandon Hoffman
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to sharing access to electronically-secured property. In some embodiments, a first computing device having a first secure element receives, from a second computing device associated with an owner of the electronically-secured property, an indication that the second computing device has transmitted a token to server computing system, the token permitting a user of the first computing device access to the electronically-secured property. Based on the received indication, the first computing device sends a request for the transmitted token to the server computing system and, in response to receiving the requested token, securely stores the received token in the (Continued)

first secure element of the first computing device. The first computing device subsequently transmits the stored token from the first secure element of the first device to the electronically-secured property to obtain access to the electronically-secured property based on the token.

20 Claims, 12 Drawing Sheets

(51) Int. Cl.
    *H04L 9/08*         (2006.01)
    *H04L 9/32*         (2006.01)
    *H04W 12/03*      (2021.01)
    *G06Q 20/38*      (2012.01)
    *H04W 4/12*       (2009.01)

(52) U.S. Cl.
    CPC .......... *H04L 9/3213* (2013.01); *H04L 9/3234* (2013.01); *H04L 9/3263* (2013.01); *H04L 63/0823* (2013.01); *G06Q 20/3825* (2013.01); *G06Q 20/3829* (2013.01); *G06Q 2220/00* (2013.01); *G06Q 2240/00* (2013.01); *H04L 2209/84* (2013.01); *H04W 4/12* (2013.01); *H04W 12/03* (2021.01)

(56) References Cited

U.S. PATENT DOCUMENTS

| | | | |
|---|---|---|---|
| 9,258,304 B2* | 2/2016 | Kohlenberg | ........ H04W 12/069 |
| 9,688,247 B1 | 6/2017 | Jayaraman et al. | |
| 10,202,100 B1 | 2/2019 | Tucker et al. | |
| 2015/0326559 A1* | 11/2015 | Kuang | .................... G06F 21/34 |
| | | | 726/5 |
| 2015/0332531 A1 | 11/2015 | Davidsson et al. | |
| 2016/0055699 A1 | 2/2016 | Vincenti | |
| 2016/0212129 A1* | 7/2016 | Johnston | ................. H04L 63/10 |
| 2017/0019396 A1* | 1/2017 | Bettenburg | ............. G06F 21/42 |
| 2017/0104589 A1 | 4/2017 | Lambert et al. | |
| 2017/0116804 A1 | 4/2017 | Bae | |
| 2018/0213405 A1 | 7/2018 | Jung et al. | |
| 2019/0349360 A1* | 11/2019 | Yeddula | .............. H04L 63/0807 |
| 2019/0375373 A1* | 12/2019 | Pepe | ..................... H04L 9/3247 |

OTHER PUBLICATIONS

International Preliminary Report in Appl. No. PCT/US2019/035937 dated Dec. 15, 2020 8 pages.

* cited by examiner

FRIEND KEY SHARING

BACKGROUND

Technical Field

This disclosure relates generally to controlling access to electronically-secured property, and, more specifically, to securely permitting access by an owner to another individual

Description of the Related Art

Traditional techniques for gaining access to functionality of a system (e.g., physical access or accessing some function of the system) include use of physical keys or electronic key fobs. Carrying such traditional keys may be inconvenient and may allow malicious entities to gain access if a key is lost or stolen. In other cases, a password, secret code (e.g. personal identification number (PIN)), or other secret known to the owner can be used to permit access. Furthermore, in modern systems, biometric data identifying the owner is used. Combinations of these techniques can also be used.

In some cases, the owner of the system wishes to permit another individual to access the system. If access is controlled by a physical key or fob, the owner must physically deliver the key/fob to the individual and then must physically retrieve the key/fob after the individual is finished with access. If access is controlled by secret data, the owner must communicate the secret data to the individual. If the communication is insecure, a third party can observe the secret data. Additionally, the secret data must be changed after the individual is finished with access to re-secure the system with respect to the user. If the system is secured by biometric data, the system generally cannot be accessed by the individual without the owner being present. Each of these options can limit the feasibility of permitting access.

Figure 1:
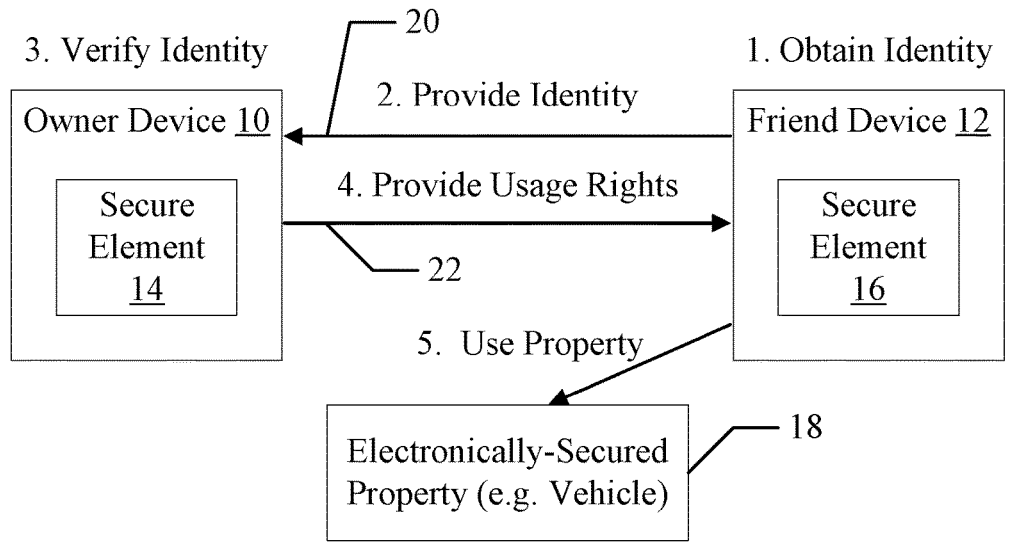
FIG. 1. is a block diagram illustrating at a high level one embodiment of a system for secure access to electronically-secured property.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure element configured to securely store a token" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Turning now to FIG. 1, a block diagram of one embodiment of a system for an owner to provide secure access to another individual (a "friend") is shown. Both the owner and the friend may possess electronic devices (10 and 12, respectively). Each device 10 and 12 includes a secure circuit referred to as a "secure element" (14 and 16, respectively). As used herein, the term "secure element" is to be interpreted according to its understood meaning in the art, and refers to circuitry that is configured to store information in a tamper-resistant manner that resists unauthorized extraction of that information. The owner owns (or exercises control over) a property 18 that is electronically-secured. That is, access to the property 18 may be permitted via electronic communication between an electronic device in possession of the accessing party and an electronic component of the property 18. The property 18 may be an electronic component (e.g. a computer system) or may be any property that includes an electronic component that controls access. For example, the property 18 may be real estate and the electronic component may be a lock that permits entry to the real estate. The property 18 may be any sort of physical property to which access can be controlled. For example, the property 18 may be a vehicle. Examples of vehicles may include, without limitation: aircraft, marine vessels, recreational vehicles (RVs), automobiles, buses, railed vehicles, spacecraft, robotic devices, etc.

The friend device 12 may obtain an identity corresponding to the friend, which the owner may use to uniquely identify the friend. The identity may include any unique data which the user may communicate to the owner. For example, the identity may include one or more of a phone number (e.g. if the device 12 is a mobile phone such as a smart phone), an email address, a name, a user name in a particular app, a user name on an account with a particular institution (e.g. an Apple® ID), etc. The friend may transmit the identity from the friend device 12 to the owner device 10 (arrow 20). The identity transmission may be accomplished in a variety of fashions in various embodiments. For example, the friend may call the owner on the owner device 10 using the friend device 12 and tell the owner the identity. The friend may text message the identity or use any other messaging mechanism (e.g. Apple's iMessage® or similar messaging services from other smart phone device manufacturers, various smart phone apps such as WhatsApp®, GroupMe®, WeChat®, etc.). The friend may email the identity to the owner. The friend may verbally convey the identity (e.g. by directly speaking to the owner), etc.

The owner may verify the identity provided by the friend. For example, if the identity is a phone number, the owner may verify the identity of the friend via previous messages in a messaging service or text stream. The owner may have a contact list in the owner device 10, and the owner may select the contact associated with the friend. The owner may speak directly with the friend to verify the identity. Any mechanism may be used in various embodiments. Once the identity is verified, the owner may transmit usage rights from the owner device 10 to the friend device 12 (arrow 22). The usage rights may be provided in a fashion that ensures that the electronically-secured property 18 may verify that the usage rights were provided by the owner to the friend. Additionally, the friend may prove his/her identity to the electronically-secured property 18. In response, the electronically-secured property 18 may permit the friend to use the property. For example, if the electronically-secured property 18 is a vehicle, the friend may operate the vehicle.

The secure elements 14 and 16 may be any type of secure circuit. For example, a secure element may include circuitry (e.g., often a single-chip microcontroller) that is configured to store information in a tamper-resistant manner that resists unauthorized extraction of that information. Non-limiting examples of form factors for secure elements include universal integrated circuit card (UICC), embedded secure element (SE), and micro secure device (microSD). In some embodiments, the secure element is also used for other types of transactions such as payment transactions, for example. For payment transactions, the secure element may cryptographically store data for payment instruments (e.g., credit cards) and owners (e.g., cardholders). The secure element may also be used to permit entry to physical locations or buildings, transmit access, etc. In some embodiments, at least a portion of secure element functionality may be cloud-based. In these embodiments, the secure element on a device may store virtual information which may be used to retrieve actual required information that is stored on a server. In some embodiments, other types of secure circuits or secure processors may perform functionality described as being performed by a secure element, including, for example, a secure enclave processor discussed below.

In an embodiment, each secure element 14 and 16 may include at least one private key that may be used with asymmetric public key/private key encryption and signing. The private key may be stored in a tamper resistant fashion that resists extraction, and thus may not be available outside of the secure element 14/16. That is, the private key may not be available even within the device 10/12, except with the corresponding secure element 14/16.

The owner device 10 and the friend device 12 may be any electronic device that includes a secure element and is able to communicate with other devices, including the other device 10 or 12 and the electronically-secured property 18. The communication maybe wireless, for example, although in some cases wired communication may be used for a portion of the communication or even all of the information. For example, the devices 10 and 12 may be mobile devices such as smart phones, personal digital assistants, tablet computers, laptop computers, etc.

While the term "friend" is used herein to describe an individual to whom the owner of the property 18 may grant access, the individual need not actually be a friend. Any individual whom the owner trusts and/or to whom the owner desires to provide access may be in the role of friend as discussed herein.

Figure 2:
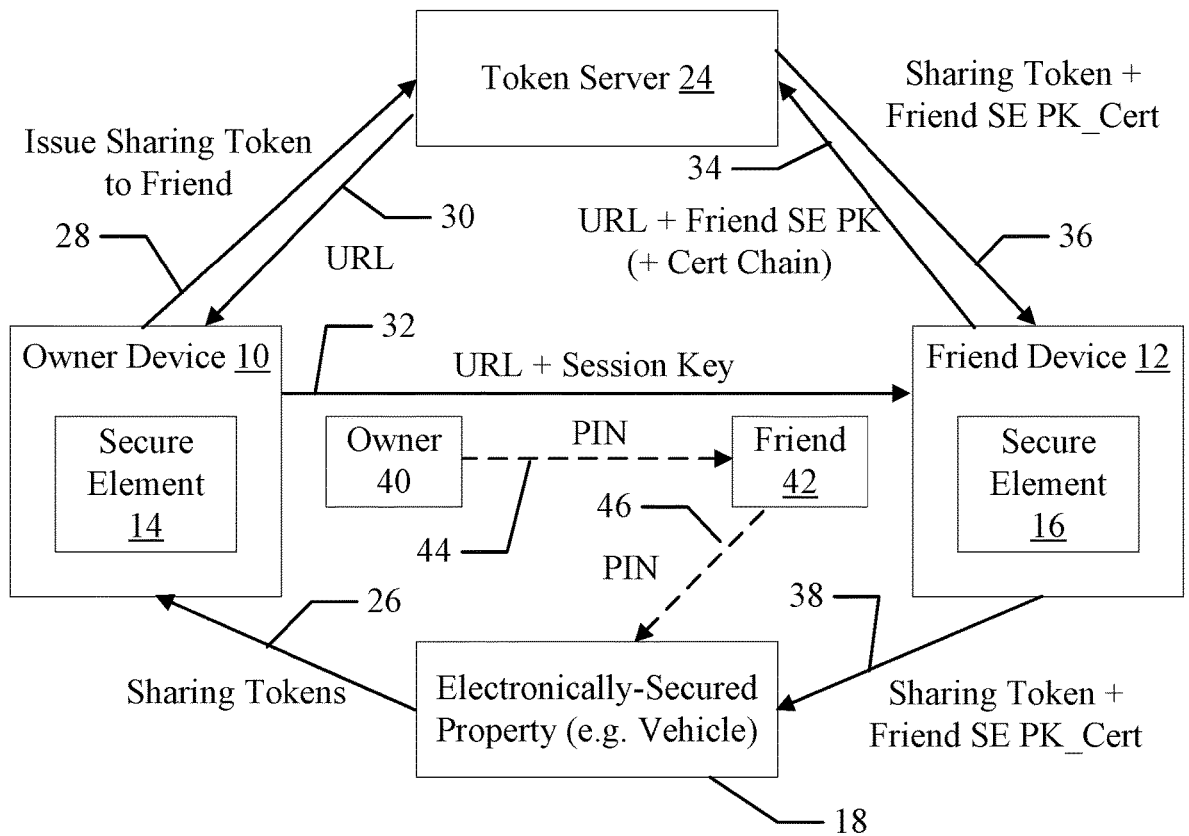
FIG. 2 is a block diagram of one embodiment of the system using a server to house sharing tokens.

Turning now to FIG. 2, a block diagram illustrating one embodiment of the system for sharing access to the electronically-secured property 18 is shown. The system may include the owner device 10, the friend device 12, and the electronically-secured property 18. Additionally, a token server 24 may be included.

The system in FIG. 2 may not directly deal with the identity transmission and identity verification aspects of the system shown in FIG. 1, in an embodiment. That is, the owner device 10 and/or the owner themselves may verify the identity of the friend in any desired fashion.

In this embodiment, the electronically-secured property 18 may issue one or more sharing tokens to the secure element 14 on the owner device 10 (arrow 26). The sharing tokens may be issued when the owner device 10 and the electronically-secured property 18 are initially paired (e.g. when the owner acquires the property 18 or causes the property 18 to be electronically-secured, if such security is established after acquisition). Various mechanisms for securely pairing the owner device 10 and the property 18 may be used in various embodiments, some of which are described in further detail below. Alternatively or in addition to issuing sharing tokens at initial pairing, other embodiments may issue sharing tokens at other points in time (e.g. upon request from the owner device 10, upon expiration of the existing sharing tokens in the owner device 10, in some embodiments, upon exhaustion of the sharing tokens in the owner device 10 due to prior use, etc.).

Each sharing token may provide the right to one friend to use the electronically-secured property 18. The owner may choose to assign a sharing token to a friend using the present procedure, and the assigned sharing token may be bound to the friend's identity so that another individual may not use that sharing token. In an embodiment, the sharing token may be limited use or single use, and once used by the friend to access the property 18 may not be used again by that friend or any other individual. The friend may obtain another sharing token if subsequent use is desired and permitted by the owner.

When the owner decides to permit a friend to access the electronically-secured property 18, the owner causes the owner device 10 to issue a sharing token (arrow 28). The owner device 10 may transmit the token to the token server 24, which may assign a universal resource locator (URL) to the token. The token server 24 may transmit the URL to the owner device 10 (arrow 30). In an embodiment, as described in more detail below, the secure element 14 may encrypt the sharing token prior to transmission to the token server 24. That is, the token server 24 may store tokens, but may not be able to determine the actual token's value. Thus, the tokens may be secure and may be decrypted and used by the friend device 12.

The owner device 10 may transmit the URL along with a session key (which may have been used to encrypt the sharing token, for example) to the friend device 12 (arrow 32). The friend device 12 may transmit the URL and the friend's secure element public key (SE PK) to the token server 24 to retrieve the sharing token (arrow 34). The token server 24 may encrypt the sharing token with the friend SE PK and may return the encrypted sharing token (arrow 36). The friend SE PK may be a public key generated by the secure element 16 for the purpose of accessing the electronically-secured property 18.

In one embodiment, the token server 24 may also provide verification of the secure element 16. That is, the token server 24 may validate that the secure element 16 is in fact a secure element that was created by a trusted source of secure elements. In such an embodiment, the friend device 12 may also transmit a certificate chain from a root of trust associated with the trusted source to the secure element 16. The token server 24 may validate the chain of trust and issue a certificate for the public key (Friend SE PK Cert in FIG. 2). If the chain of trust is not valid, the token server 24 may not transmit the certificate, or may not even transmit the encrypted sharing token, in an embodiment.

The secure element 16 in the friend device 12 may decrypt the sharing token and transmit the sharing token and the certificate to the electronically-secured property 18 (arrow 38) to request access. The electronically-secured property 18 may verify the sharing token and the certificate and may grant access in response to correct verification of both. In one embodiment, the owner (illustrated at reference numeral 40) may assign a second form of security to the sharing key by assigning a PIN to the sharing token and transmitting the PIN to the friend (illustrated at reference numeral 42). Any second form of security may be used, in various embodiments. The friend 42 may supply the PIN to the electronically-secured property 18 (e.g. manually typing the PIN when prompted).

The second form of security may be transmitted via a separate channel from the URL and session key. For example, arrow 32 may represent a transmission as a text message, iMessage, or any other messaging app. The arrow 44 may be transmitted orally, via phone call, or transmitted using a different messaging app or text system. In other embodiments, a second form of security may not be needed.

The PIN may be generated in a variety of fashions, in various embodiments. For example, during pairing or at other times when the owner device 10 is located within or at the electronically-secured property 18, the property 18 and the device 10 may create a shared secret. The PINs may be derived based on the shared secret and a known random number source or the like, so that both the device 10 and the property 18 may derive the same PIN separately. Alternatively, a set of PINs may be generated and securely stored in the secure element 14, and a PIN may be displayed to the owner to given to the friend. The owner may physically create and change PINs while the device 10 is paired with the property 18, in another embodiment. In still another embodiment, the owner may choose any PIN and give it to the friend and may also encrypt the PIN with the public key of the property 18. The owner may send the encrypted PIN from the owner device 10 to the friend device 12, and the friend device 12 may transmit the encrypted PIN along with the other information. The property 18 may decrypt the PIN with its private key and compare the decrypted PIN to the PIN entered by the friend to verify correct entry.

The use of the sharing token in this case may permit the use of the friend SE PK to access the electronically-secured property 18 without requiring the friend SE PK to be provided to the owner device 10. Thus, in an embodiment, the use of the sharing token may eliminate a round trip communication between the owner device 10 and the friend device 12.

In another embodiment, the round-trip communication between the owner device 10 and the friend device 12 may be eliminated without the use of the sharing token. For example, the communication between the owner device 10 and the token server 24, and between the token server 24 and the friend device 12, may be a secure mechanism such as the transport layer security (TLS) mechanism. The TLS mechanism may be used to ensure that the correct server 24 is being communicated with by each device 10 and 12. When the owner 40 decides to share the electronically-secured property 18 with the friend 42, the owner may transmit a request to the server 24 and may obtain a URL. If there are other tokens, such as the immobilizer token discussed below, the owner device 10 may encrypt the other tokens and place them on the server 24 as discussed herein. The friend may receive the URL and query the server 24, which may validate the friend's SE and returned the friend SE PK certificate as discussed above. The friend may also receive the other tokens, as needed, per the discussion herein.

As mentioned previously, the transmission represented by arrow 26 may be part of the pairing process. The sharing tokens may be transmitted over a secure, wireless communication between the electronically-secured property 18 and the device 10. Alternatively, a wired connection may be used. The devices 10 and 12 may be coupled to the token server 24 over any desired network (e.g. local area network, wide area network, the Internet, etc.). Any combination of networks may be used. The network may be wireless, wired, or any combination thereof.

The sharing tokens may be of a sufficient size (e.g. number of bits) that the valid sharing token values may be sparse in the total values that are possible at the size. That is, the sharing tokens may be unlikely to be guessed by a third party attempting to impersonate the friend.

Figure 3:
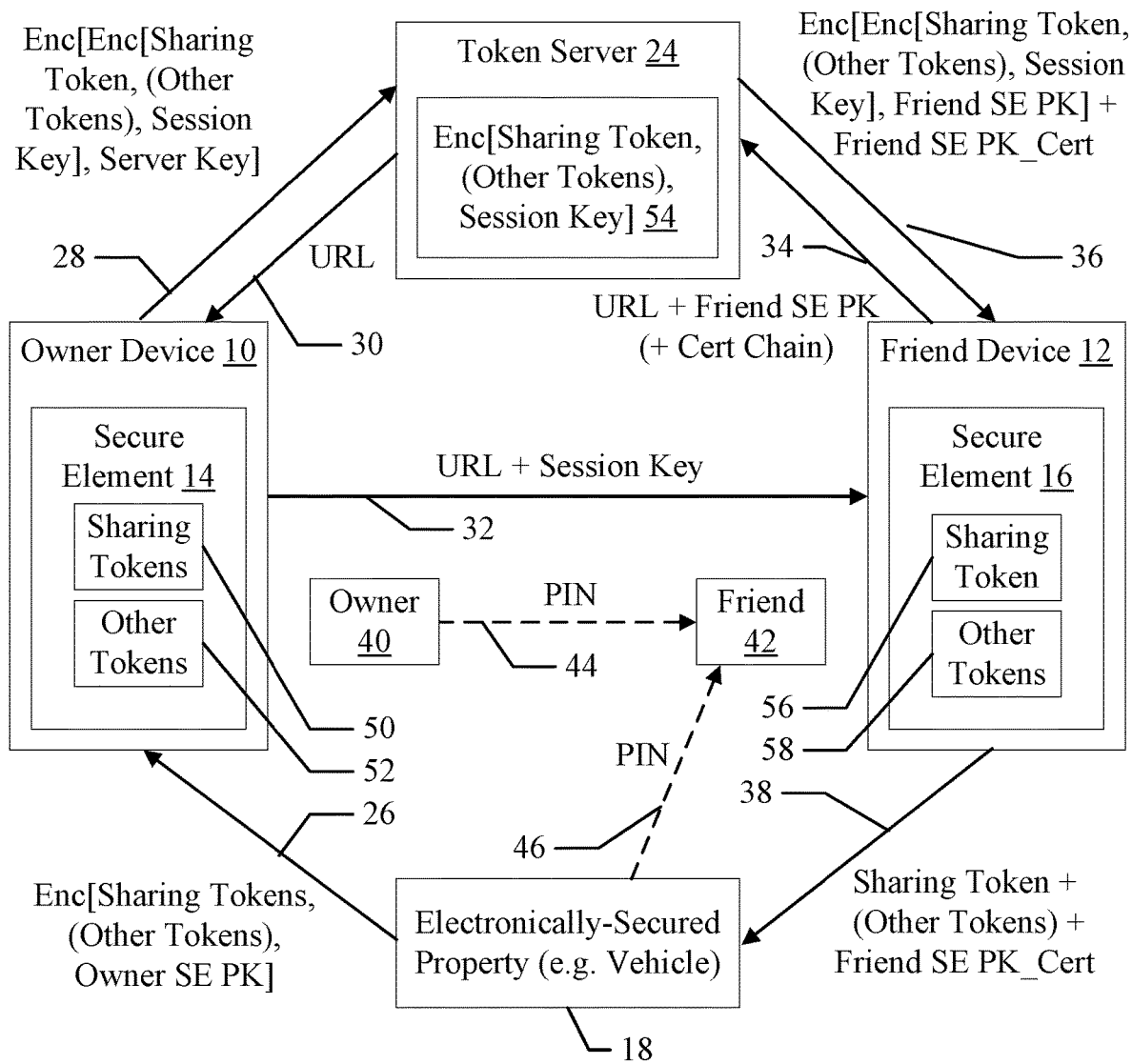
FIG. 3 is a block diagram of one embodiment of the system illustrating encryption of some of the communications.

Turning now to FIG. 3, a more detailed block diagram of an embodiment of the system of FIGS. 1 and 2 is shown. The embodiment of FIG. 3 illustrates the use of encryption to secure the transmissions between the devices 10 and 12, the token server 24, and the electronically-secured property 18. The notations on FIG. 3 may be read as follows: "Enc" stands for the encryption function, followed by a square-bracketed list of data that is encrypted. The last item in the list is the key used for the encryption.

Thus, the electronically-secured property 18 may encrypt the sharing tokens using the owner secure element public key (SE PK) (arrow 26). The owner device 10 (and more particularly the secure element 14) may provide the owner SE PK during the pairing process. In some embodiments, there may be one or more other tokens that are included with the sharing tokens. The other tokens may be tokens used by the electronically-secured property 18 in addition to the sharing tokens or, in the case of the owner, the owner's credentials, to provide access to the property or enable certain features or operations of the property 18. For example, if the property 18 is a vehicle and more specifically an automobile, an immobilizer token may be required permit the automobile to operate. The immobilizer token may be one of the other tokens.

The secure element 14 may decrypt the sharing tokens and the other tokens, and securely store them within the secure element 14 (e.g. reference numerals 50 and 52, respectively). When the owner 40 decides to assign a sharing token to the friend 42, the owner device 10 may request a sharing token package from the secure element 14 to be sent to the token server 24. The secure element 14 may generate a session key, which may be a public key to be used for the encryption of the sharing tokens only. The secure element 14 may select a sharing token 50 and the other tokens 52 (if applicable) and encrypt the tokens using the session key. The encryption result may then be encrypted using the token server's public key ("server key" in FIG. 3) and transmitted to the token server 24 (arrow 28). The token server 24 may return the URL to the owner device 10 (arrow 30). The secure element 14 may delete the selected sharing token in an embodiment if the sharing token may only be used once, or if it is limited use and the number of uses has expired. As mentioned above, in embodiments in which other tokens are used and a sharing token is not used, the package may contain the other tokens only.

The token server 24 may decrypt the received data using its private key and may store the data on the token server (reference numeral 54). As illustrated in FIG. 3, the decrypted result is still encrypted data, encrypted according to the session key. Thus, the token server 24 does not have access to the actual sharing token or other tokens, and any observer (e.g. a nefarious third party such as a hacker) also does not have access to the actual sharing token or other tokens.

The owner device 10 may transmit the URL from the token server 24 and the session key to the friend device 12 (arrow 32). In an embodiment, a session identifier (ID) may be embedded in the URL. In other embodiments, the session ID may be provided separately. The friend device 12 may transmit the URL to the token server 24, along with the public key from the secure element 16 (the friend SE PK in FIG. 3) (arrow 34). The token server 24 may access the encrypted sharing token (reference numeral 54) based on the URL (and optionally the session ID), and may encrypt the data again using the friend SE PK. The token server 24 may transmit the encrypted data to the friend device 12 (in response to the URL). Additionally, if the token server 24 verifies the chain of trust for the friend SE PK, the token server 24 may return a certificate for the friend SE PK.

The secure element 16 may decrypt the data with its private key, then decrypt with the session key to obtain the sharing token and the other tokens (if applicable). Until the sharing token and other tokens are ready to be transmitted to the electronically-secured property 18, they may be securely stored in the secure element 16 (reference numerals 56 and 58, respectively).

The friend device 12 may transmit the sharing token (if applicable), the other tokens (if applicable) and the friend SE PK certificate to the electronically-secured property 18 to access the electronically-secured property 18 (arrow 38). The friend may also enter the PIN (arrow 46). The electronically-secured property 18 may permit the access after verifying the tokens, pin, and certificate.

In an embodiment, the electronically-secured property 18 may check an age of the sharing token and prevent access if the sharing token has expired. The electronically-secured property 18 may also record the sharing token as used, so that it may not be used again in the future by either then friend device 12 or any other device.

In an embodiment, there may be one or more mechanisms for revoking the sharing token after it has been issued (e.g. if the owner changes his/her decision to permit access to the electronically-controlled property 18 or the sharing token is somehow lost and thus should not be useable). The owner may be able to revoke the sharing token from the server 24, in which case the server 24 may delete the encrypted sharing token 54 if it has not already been provided to the friend device 12. Additionally or alternatively, a revocation mechanism may be supported between the electronically-secured property 18 and the owner device 10. The owner device 10 may transmit a revocation of a particular sharing token, and the electronically-secured property 18 may refuse to recognize the revoked sharing token if it is presented.

The embodiment of FIGS. 2 and 3 provides a secure solution for sharing access to the electronically-secured property 18 for cases in which the owner device 10 and the friend device 12 have network access. In an embodiment, it may also be desirable for the owner to permit access for the friend in a location where there is no network access (and thus the token server 24 my not be used. For example, the owner and friend may be in a remote area that may not have wireless access. The owner may wish to allow the friend to return to the electronically-secured property 18 without the owner and to allow the friend access to the property.

Figure 4:
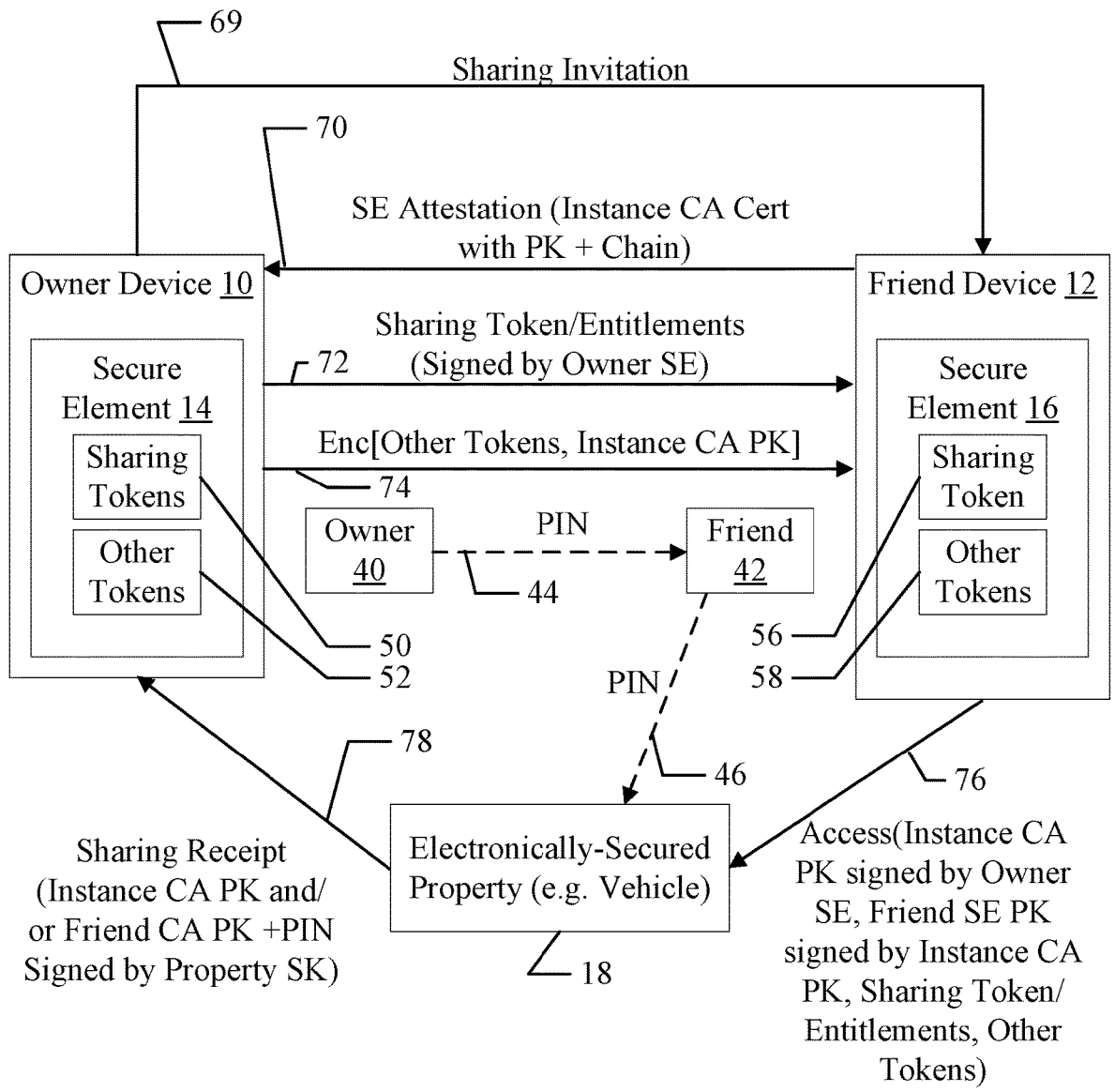
FIG. 4 is a block diagram of one embodiment of the system using peer-to-peer communication.

Turning now to FIG. 4, a block diagram of an embodiment that may be used to permit such access is shown. In FIG. 4, the secure element 14 is securely storing sharing tokens 50 and other tokens 52 previously issued to the owner device 10 by the electronically-secured property 18. The owner 40 may decide to share a key to the electronically-secured property 18 with the friend 42. The owner 40 may optionally transmit a sharing invitation to the friend 42 using the owner device 10 (arrow 69). The sharing invitation may have any form and communication channel, in various embodiments. The embodiments of FIGS. 2 and 3 may have a sharing invitation transmission as well, in some embodiments.

As with the embodiment of FIGS. 2 and 3, the identity of the friend and verification thereof by the owner has occurred previously (e.g. via previous messaging between the owner 40 and the friend 42). The friend device 12 (and more particularly the secure element 16) may respond to the sharing invitation, and may attest to the security of the secure element 16 by providing a certificate authority (CA)-issued certificate for the secure element 16 along the secure element public key and the chain of trust from a root of trust at the manufacturer of the secure element 16 through any intermediaries (e.g. the manufacturer of the friend device 12) to the present configuration (arrow 70). The certificate may be an Instance CA generated by the friend secure element 16 using its private key. The owner device 12/secure element 14 may validate the attestation and, in response to verification of the attestation, the secure element 14 may select a sharing token from the tokens 50, sign the sharing token, and provide the signed sharing token and to the friend device 12 (arrow 72). The sharing entitlements permitted based on the sharing token may be provided as well, again signed by the owner SE 14. Additionally, the other tokens 52 may be provided, encrypted by the secure element 14 using the Instance CA PK from the friend device 12 (arrow 74). In other embodiments, the sharing token may not be used, as discussed previously.

The communications represented by the arrows 70, 72, and 74 may be provided over secured radio transmission directly between the devices 10 and 12 in a peer-to-peer communication. In an embodiment, the messaging may be performed via texting, messaging apps such as iMessage, WhatsApp, GroupMe, WeChat, etc.

The secure element 16 may decrypt the other tokens 58 and sharing token 56 (and/or sharing entitlements) and may store them securely. When the friend attempts to access the electronically-secured property 18, the friend device 12 may transmit an access request including the instance CA PK signed by the owner SE 16, the friend SE PK signed by the instance CA PK, the sharing entitlements/sharing token (signed by the owner SE 14) and the other tokens (arrow 76). The friend 42 may input the PIN provided by the owner 40, and the electronically-secured property 14 may permit access after properly verifying the entitlements, the owner SE signature, the Instance CA PK, and the Instance CA certificate.

Figure 10:
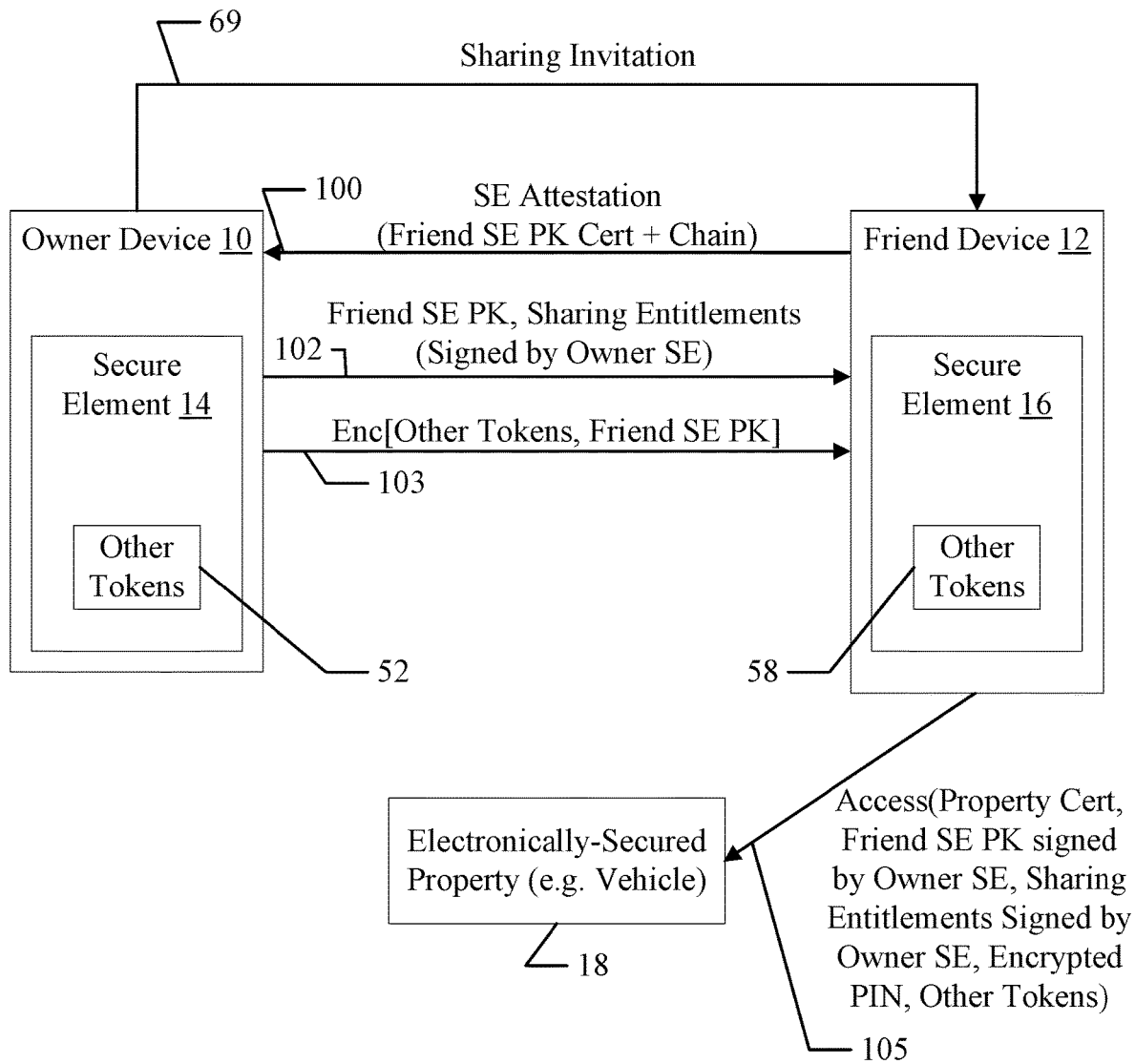
FIG. 10 is a block diagram of another embodiment of subsequent communications for any of the peer-to-peer embodiments of FIGS. 4 to 8.

When the property 18 is able to reach a network to connect with the owner device 10, the property 18 may provide a sharing receipt to the owner device 10 (arrow 78). The receipt may include the Instance CA PK from the SE attestation by the friend device 12 (arrow 70) and the pin, signed by the property 18's private key (SK). In an embodiment, the transmission represented by arrow 78 may be eliminated. In another embodiment, the transmission of the receipt may permit the friend's public key to be used with the sharing entitlements assigned by the owner without requiring that the PIN be entered. An example of such communication is illustrated in FIG. 10 and discussed in more detail below.

Figure 5:
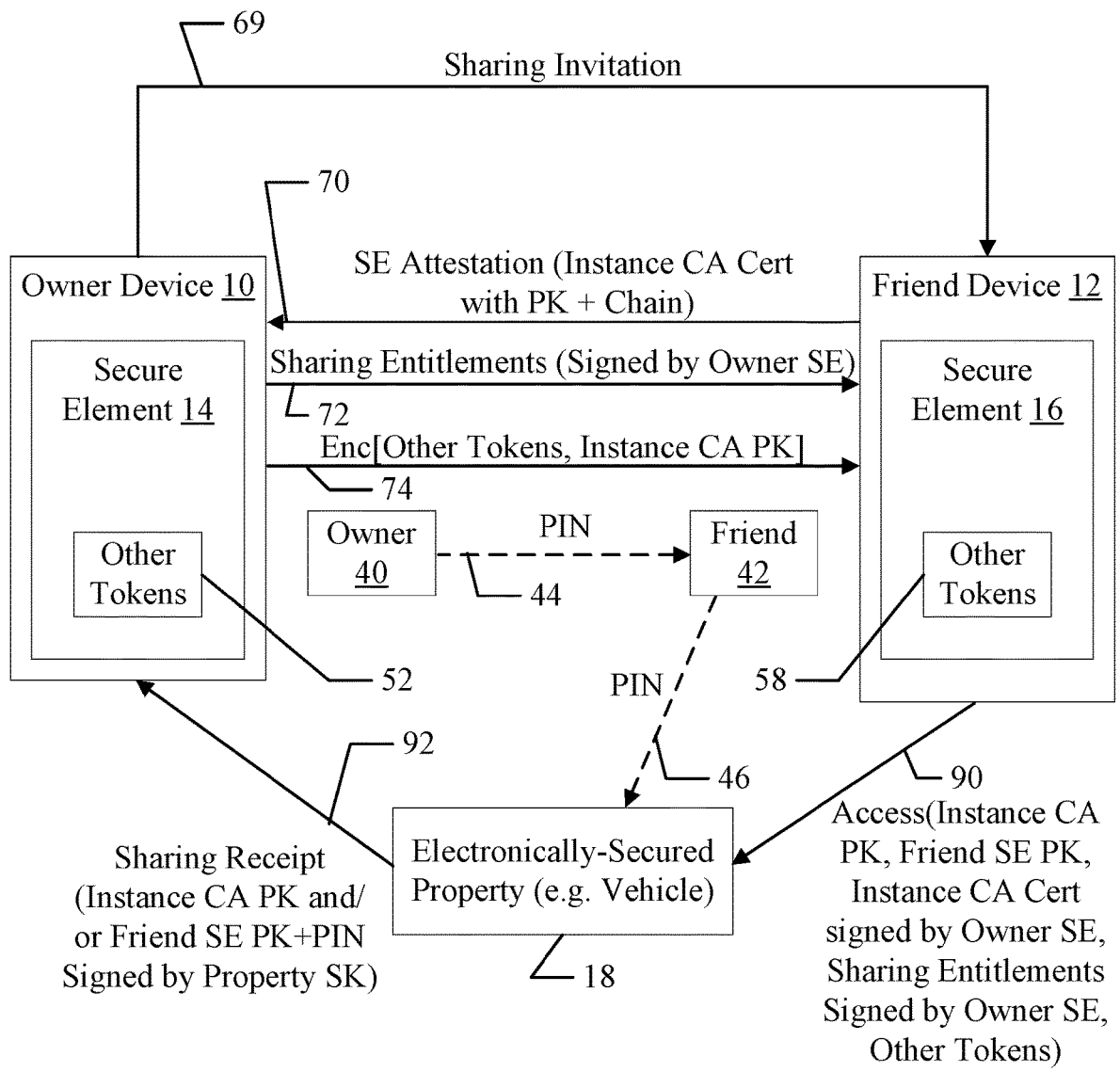
FIG. 5 is a block diagram of a second embodiment of the system using peer-to-peer communication.

Turning now to FIG. 5, a block diagram of a second embodiment of the peer-to-peer mechanism is shown. In this embodiment, the sharing tokens may be eliminated. Similar to the embodiment of FIG. 5, the owner device 10 may transmit a sharing invitation (arrow 69) and the friend device 12 may transmit the SE attestation, and the secure element 14 may validate the chain of trust (arrow 70). After successfully validating the SE attestation, the secure element 14 may sign a set of sharing entitlements that the owner 40 wishes to grant to the friend, and the owner device 10 may transmit the signed entitlements to the friend device 12 (arrow 72). Other tokens that may be needed for the sharing entitlements may be encrypted and sent as well, according to the Instance CA PK (arrow 74). The friend device 12 may transmit the Instance CA PK, the instance CA certificate signed by the secure element 14, the sharing entitlements signed by the secure element 14, and the other tokens to the electronically-secured property 18 (arrow 90). The electronically-secured property 18 may verify the signatures and may permit access based on the relationship of the property 18 to the owner and the owner's signature on the sharing entitlements and the user's secure element public key.

In an embodiment, the electronically-secured property 18 may provide a sharing receipt (which in this case may include the instance CA PK and PIN, signed by the property 18's secure element private key (SK) (arrow 92). As with the embodiment of FIG. 4, an embodiment of the owner device 10 may remove the requirement that a PIN be entered for subsequent sharing by the friend responsive to the receipt (which indicates that the friend properly access the property 18).

Figure 6:
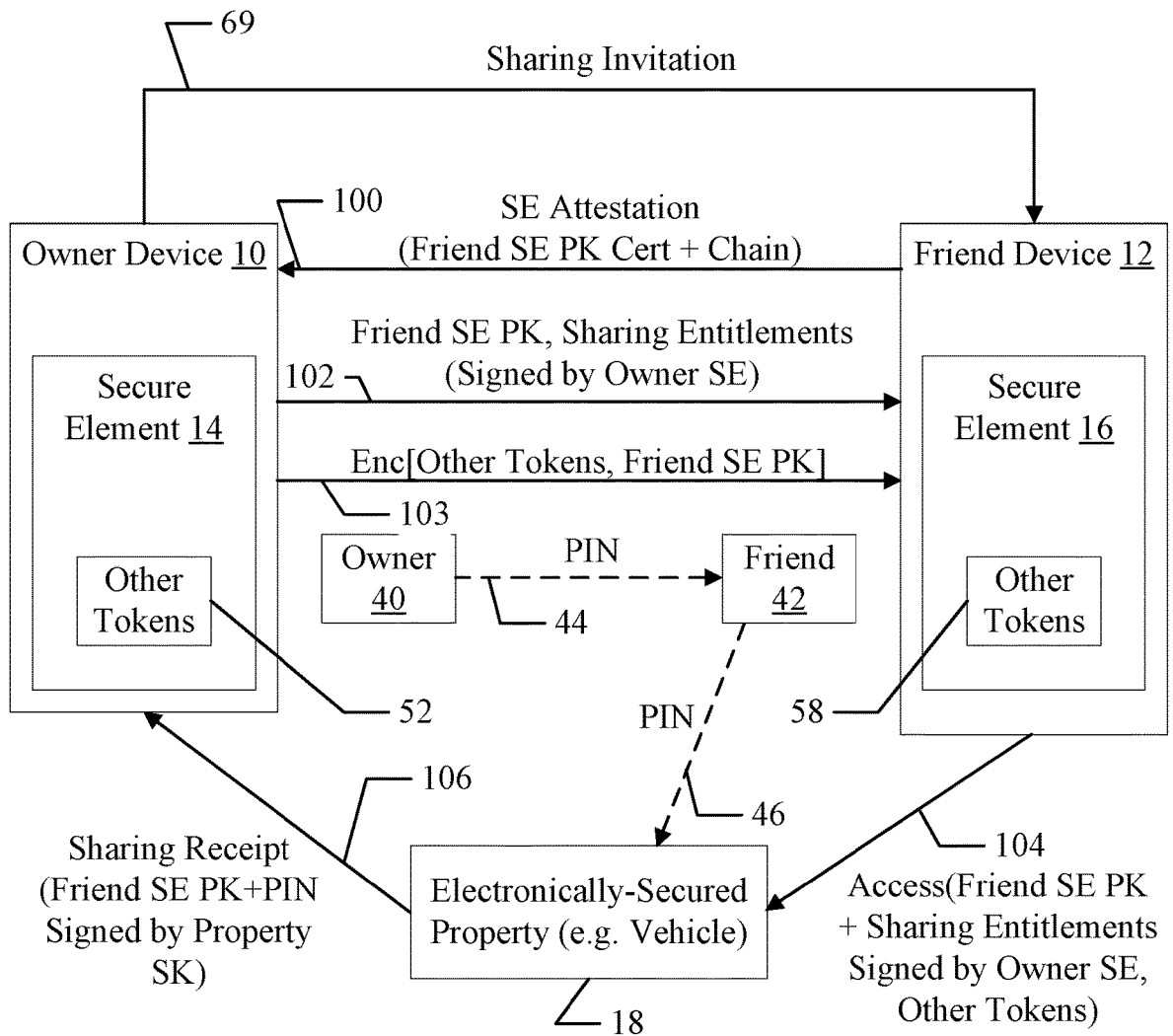
FIG. 6 is a block diagram of a third embodiment of the system using peer-to-peer communication.

Turning now to FIG. 6, a third embodiment of the peer-to-peer mechanism is shown. In the embodiment of FIG. 6, the SE attestation from the friend device 12 includes a certificate generate from the friend's secure element public key and the chain of trust (arrow 100). The secure element 14 may validate the chain of trust and, responsive to successful validation, may return the sharing entitlements and the friend SE PK, signed by the owner secure element 14 (arrow 102). Any tokens used to access the property 18 and/or to use the entitlements granted by the owner may be encrypted to the friend SE PK and transmitted to the friend device 12 (arrow 103). The friend device 12 may access the property 18 using the signed friend SE PK and the sharing entitlements, and other tokens 58 as needed (arrow 104). After successful validation of the signed friend SE PK and other tokens, the property 18 may permit the access according to the sharing entitlements. In an embodiment, the property 18 may provide the sharing receipt (the friend SE PK and PIN, signed by the property 18's private key, in this case) (arrow 106) to permit the friend SE PK to be used for subsequent sharing without requiring the PIN.

Figure 7:
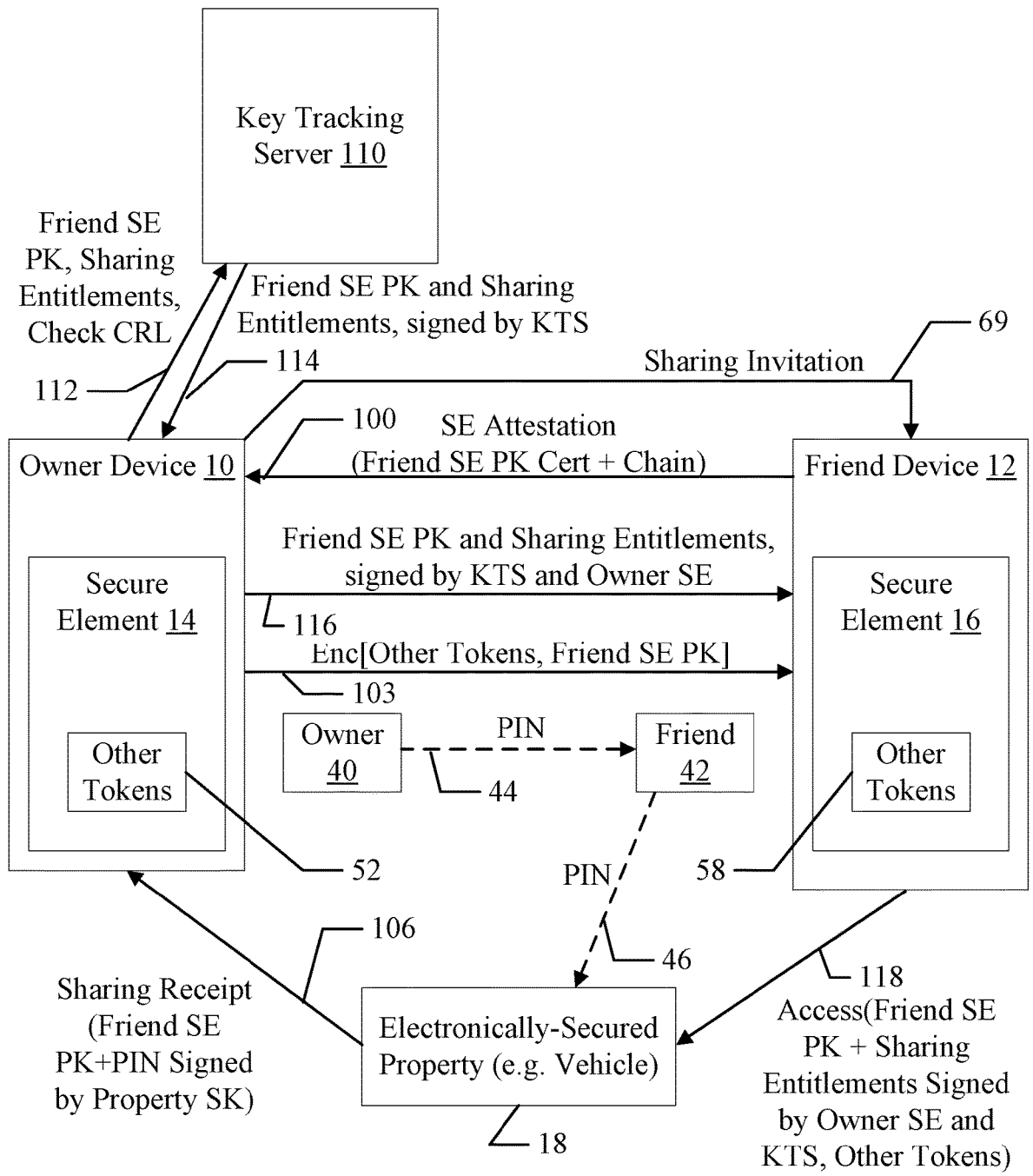
FIG. 7 is a block diagram of a fourth embodiment of the system using peer-to-peer communication.

Turning now to FIG. 7, a block diagram of a fourth embodiment of the system is shown in which a key tracking server 110 is used to detect when public keys are being used in an attack or other nefarious way, and/or to detect revoked certificates. The embodiment of FIG. 7 begins with the sharing invitation (arrow 69) and the SE attestation (arrow 100), similar to the embodiment of FIG. 6. Other embodiments may implement attestations similar to the other embodiments such as those shown in FIGS. 4, 5, and 6. The secure element 14 may validate the friend SE PK certificate, as in the embodiment of FIG. 6 as well. The secure element 14 may also cause the owner device 10 to transmit the friend SE PK and sharing entitlements to the key tracking server 110 and may request that the key tracking server 110 check a certificate revocation list (CRL) to determine if the friend SE PK has had its certificate revoked (e.g. due to suspicious behavior detected from the key's use, etc.). If the friend SE PK has not been revoked and there are no other issues detected by the key tracking server 110, the key tracking server 110 may sign the friend SE PK and the sharing entitlements. The secure element 14 may also sign the friend SE PK and the sharing entitlements and return the same to the friend device 12 (arrow 116). Additionally, the secure element 14 may encrypt the other tokens 52, as needed, to the friend SE PK and transmit the encrypted tokens to the friend device 12 (arrow 103). The secure element 16 in the friend device 12 may attempt to access the property 18 using the key and the sharing entitlements signed by both the secure element 14 and the key tracking server 110 (arrow 118). The property 18 may permit the access based on the sharing entitlements after validating the signature from both the owner secure element 14 and the key tracking server 110.

The same key tracking server 110 may be used by various owners of electronically-secured properties, so that potential nefarious activities may be detected. Additionally, certificate revocations may be available to each owner based on the tracking implemented by the key tracking server 110. The key tracking server 110 may also track which public keys have accessed which properties, which may permit determination of which key was used to steal the property (if it becomes stolen) and/or various other purposes.

Figure 8:
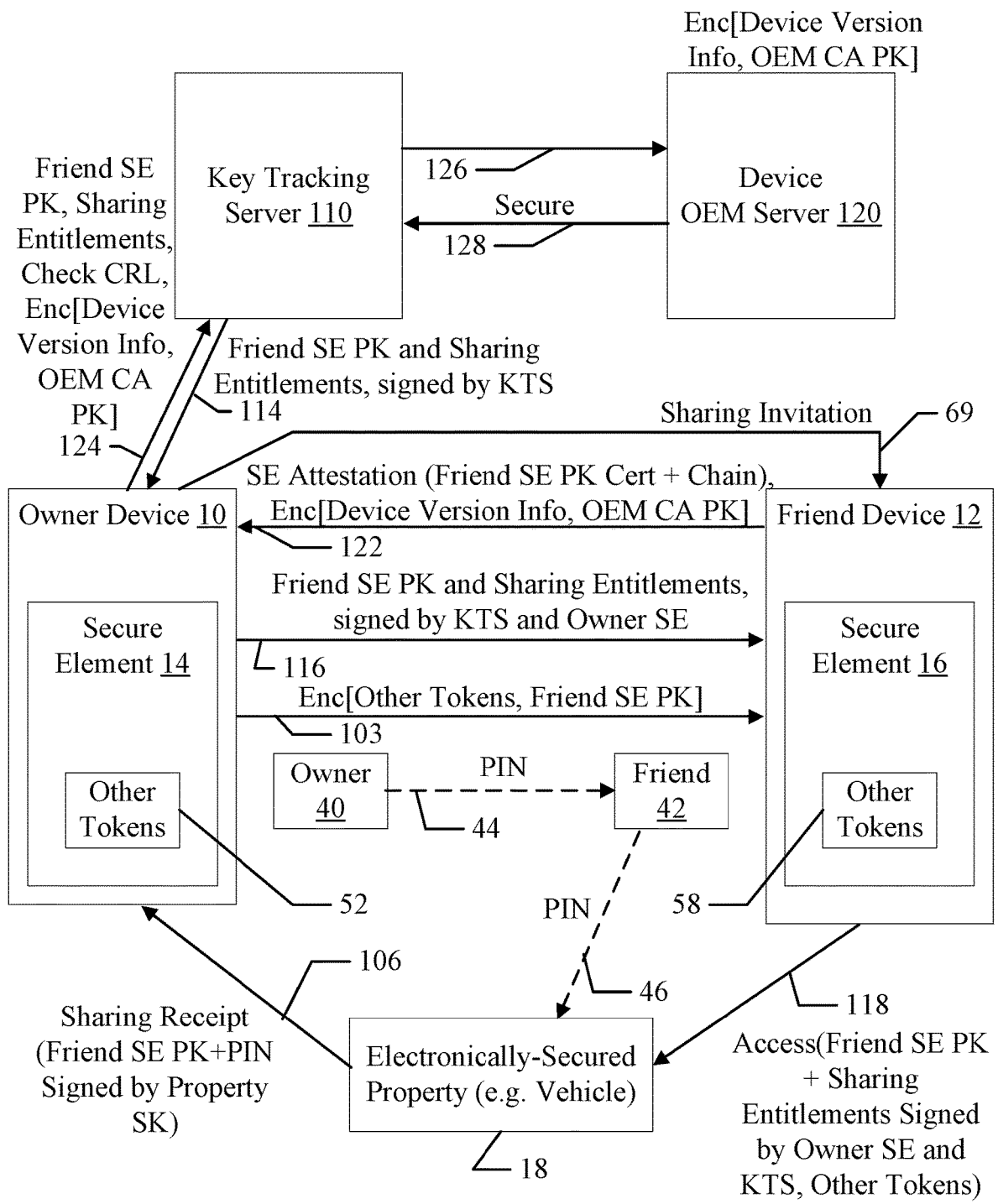
FIG. 8 is a block diagram of a fifth embodiment of the system using peer-to-peer communication.

Turning now to FIG. 8, a fifth embodiment of the system based on the embodiment of FIG. 7 is shown. The fifth embodiment may be used to ensure that the friend device 12 does not have known security vulnerabilities that might increase the risk of sharing the property 18 with the friend. For example, if the friend device 12 has a security vulnerability, the friend may exploit the vulnerability to modify the sharing entitlements.

In the embodiment of FIG. 8, in addition to transmitting the SE attestation to the owner device 10, the friend device 12 may transmit data describing the device version information of the friend device 12 (arrow 122). The device version information may be encrypted to an original equipment manufacturer (OEM) CA public key corresponding to the OEM that manufactured the device 12. For example, the device version information may include the operating system version that is currently in use on the device 12, the version of any security software included on the device 12, and the version of any other applications that may be involved in the security of the device 12. The device itself may have hardware and/or firmware versions that may be identified as well.

The owner device 10, in addition transmitting the friend SE PK certificate and the sharing entitlements to the key tracking server 110, may also transmit the encrypted device version information to the key tracking server 110 (arrow 124). In addition to the operation described for the embodiment of FIG. 7 for the key tracking server 110, the key tracking server 110 may also communicate with a device OEM server 120 corresponding to the device OEM that manufactured the friend device 12. There may be different device OEM servers 120 for different OEMs. The key tracking server 110 may transmit the encrypted device version information to the OEM server 120 (arrow 126). The OEM server 120 may decrypt the device version information and may check the combination of versions in the device version info for known security vulnerabilities. If the combination is known to exhibit a security vulnerability, the device OEM server 120 may return a response indicating insecure. On the other hand, if there are no known security vulnerabilities in the version, the device OEM server 120 may return a secure response (arrow 128). If the secure response is received, in addition to clearing the revocation lists and other checks implemented by the key tracking server 110, the key tracking server 110 may sign the friend SE PK and sharing entitlements and return to the owner device 10 (arrow 114). Operation may continue in this case similar to the discussion above from the embodiment of FIG. 7 (arrows 116, 118, and 106). If either the insecure response is received, or the friend SE PK is on the revocation list or fails another check in the key tracking server 110, the key tracking server 110 may not sign the friend SE PK and sharing entitlements, and access to the property 18 may not be granted.

In other embodiments, the owner device 10 may communicate directly with the OEM server 120 to verify security of the device 12. Any mechanism for checking the device version information may be used. It is noted that, by encrypting the device version information, combinations of versions that are insecure may not be visible to the owner device 10 or others. Thus, the existence of various security vulnerabilities may be less widely disseminated than if the device version information were transmitted in the clear (allowing the device version information to be observed) and the insecure response was received.

Figure 9:
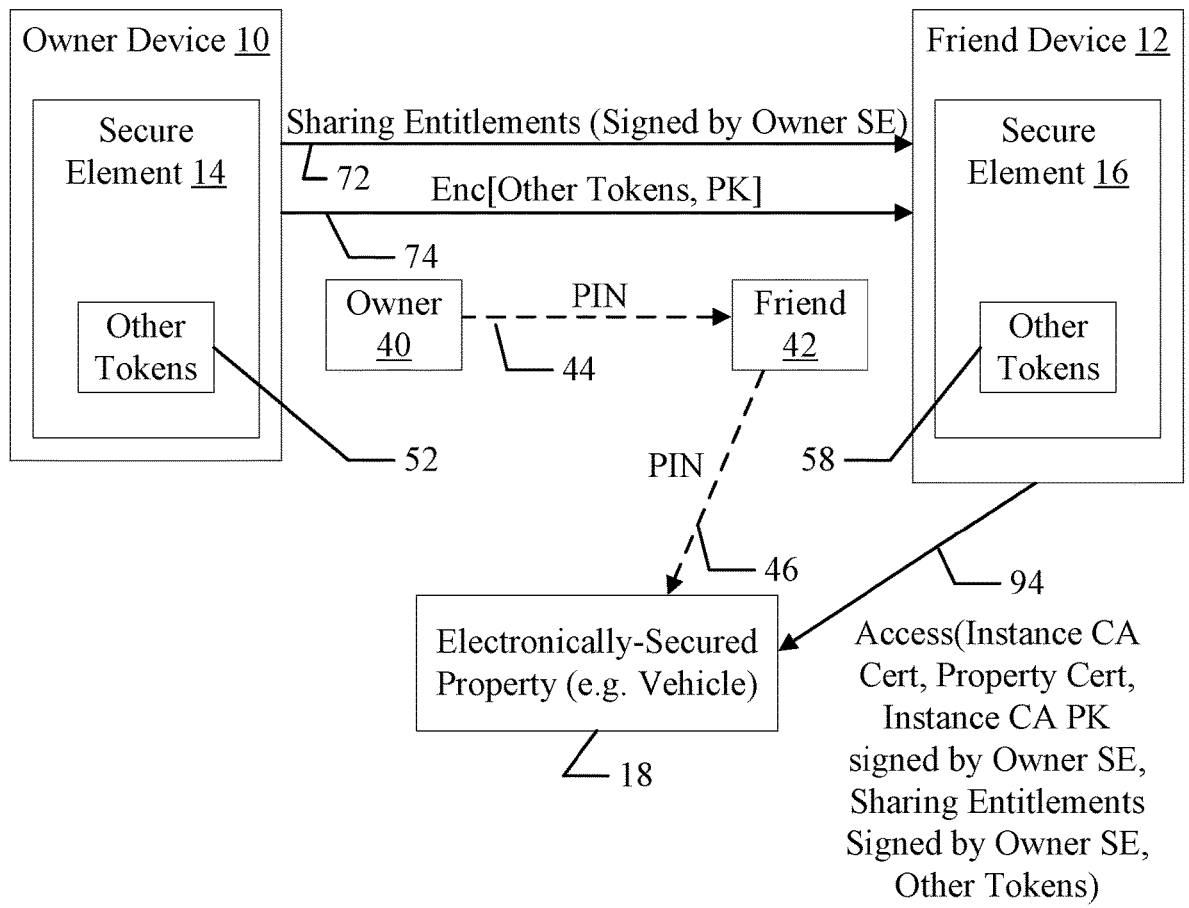
FIG. 9 is a block diagram of one embodiment of subsequent communications for any of the peer-to-peer embodiments of FIGS. 4 to 8.

Turning now to FIG. 9, a block diagram of an embodiment of the peer-to-peer system is shown. In some embodiments, the peer-to-peer system may be used to eliminate the "round trip" of the sharing invitation and the SE attestation from the friend device 12. In the illustrated embodiment, the owner device 10 may provide another set of sharing entitlements signed by the secure element 14 to the friend device 12, without requiring a new attestation. The other tokens 52, as needed, may be encrypted to the PK that is being used (instance CA PK, or friend SE PK, in various embodiments). The friend device 12 may attempt the access using the instance CA certificate (or the signed friend SE PK, depending on the embodiment), a certificate for the property 18, the signed sharing entitlements, and the other tokens as needed (arrow 94). The electronically-secured property 18 may verify the signatures and the PIN provided by the friend 42. If the information is correctly validated, the property 18 may permit the access.

Turning now to FIG. 10, a block diagram of an embodiment of the peer-to peer system is shown. In some embodiments, the peer-to-peer system may be used after the sharing receipt has been received by the owner device 10. In the illustrated embodiment, the owner device 10 may transmit the sharing invitation (arrow 69) and may receive the SE attestation (arrow 100). The owner device 10 may provide the sharing entitlements signed by the secure element 14 to the friend device 12. The sharing entitlements may include the PIN used by the friend previously (received by the owner device 10 in the sharing receipt from the property 18, encrypted to the public key of the property 18). The friend device 12 may attempt the access using the instance CA certificate (or the signed friend SE PK, depending on the embodiment), the friend SE PK signed by the instance CA, if appropriate, a certificate for the property 18, the signed sharing entitlements, the encrypted PIN, and the other tokens as needed (arrow 105). The electronically-secured property 18 may verify the signatures and may decrypt the PIN and determine that it is the same PIN originally provided by the friend. If the information is correctly validated, the property 18 may permit the access.

Figure 11:
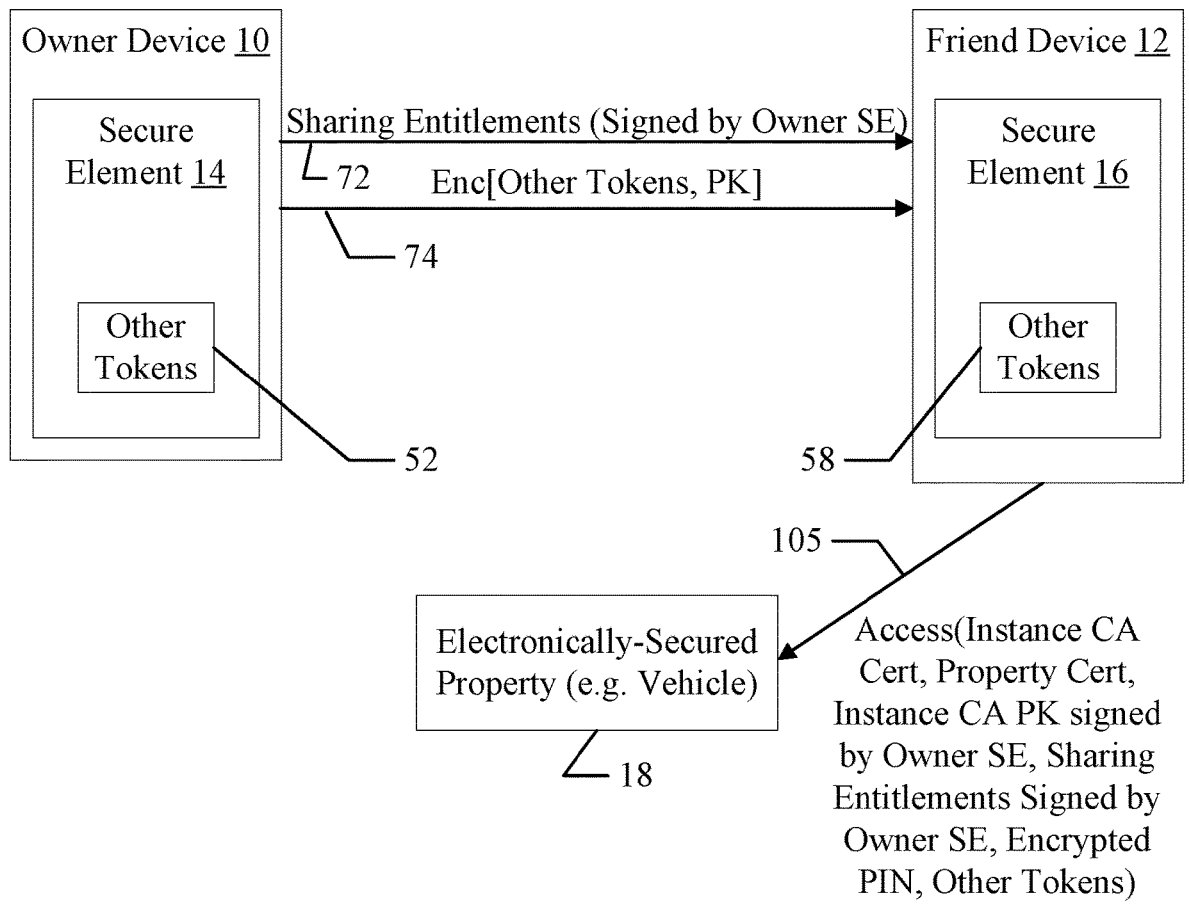
FIG. 11 is a block diagram of yet another embodiment of subsequent communications for any of the peer-to-peer embodiments of FIGS. 4 to 8.

Turning now to FIG. 11, a block diagram is shown that includes both optimizations for subsequent access as shown in FIGS. 9 and 10. That is, the embodiment of FIG. 11 may eliminate both the round trip to attest the friend SE and the PIN entry.

Figure 12:
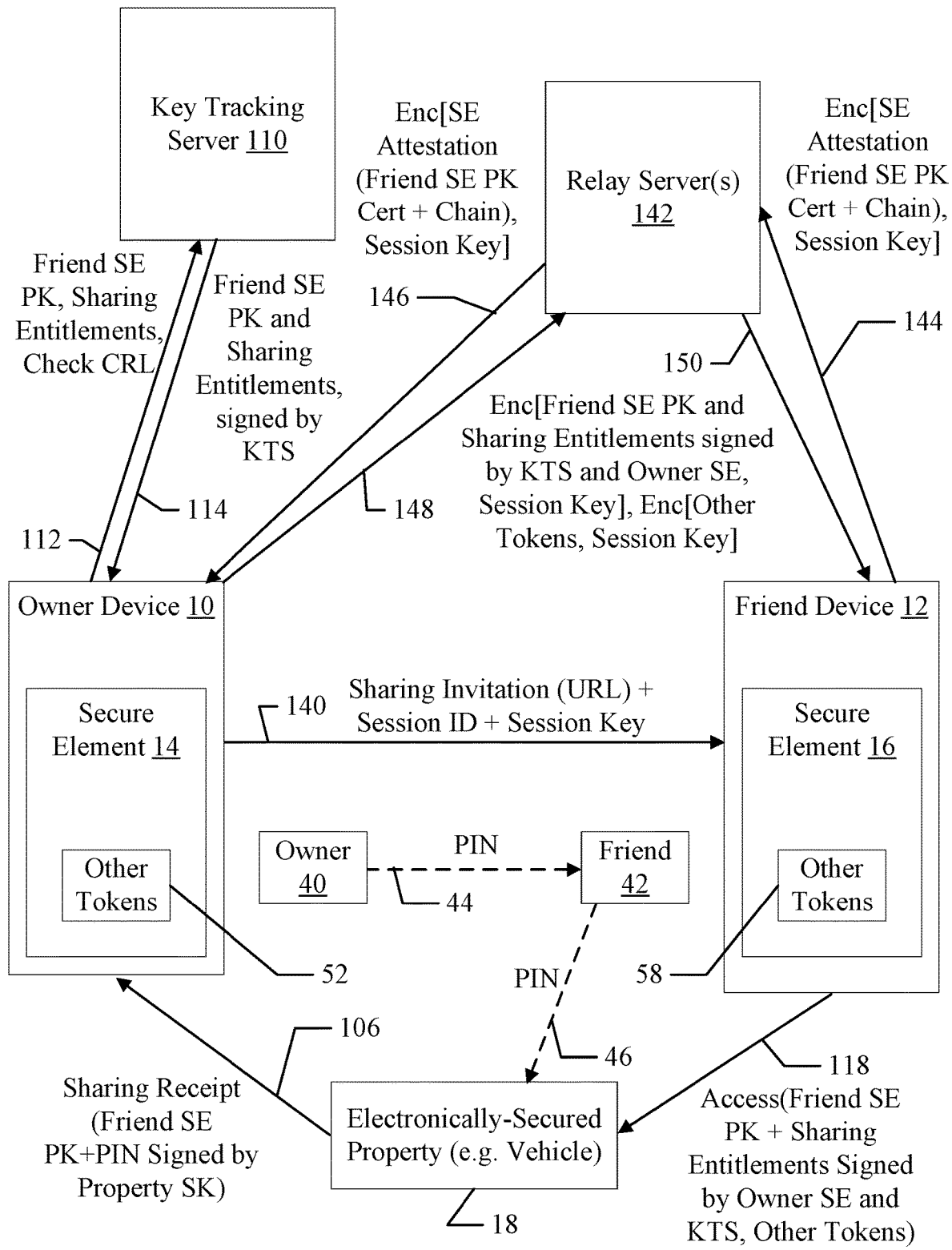
FIG. 12 is a block diagram of another embodiment of a system for secure access to electronically-secured property.

Turning now to FIG. 12, a block diagram of another embodiment of a system to share access to the property 18 is shown. In the embodiment of FIG. 12, one or more relay servers 142 may be used to permit the owner 40 to make a single communication to the friend 42 to provide a sharing, at least in terms of the owner 40's direct interaction. In this embodiment, the owner device 10 may transmit a sharing invitation, with a URL and session ID provided from the relay server 142. The owner device 10 may obtain the URL and the session ID at some point prior to the sharing (e.g. well in advance, or in response to the user 40 deciding to perform the share). The owner device 10 may also generate a session key to be used for encryption by the devices 10 and 12 for data to be transferred through the relay servers 142. That is, the relay servers 142 may not be able to observe the data passing through the relay servers 142. The session key need not, in an embodiment, be a secure element key. In an embodiment, the session key may be a symmetrical key that may be used for both encryption and decryption (arrow 140 in FIG. 12).

The friend device 12 may encrypt its SE attestation (e.g. the friend SE PK certification and chain) do the session key and may transmit the encrypted attestation to the relay servers 142 using the URL. The owner device 10 may download the encrypted attestation from the relay servers 142 using the URL. The owner device 10 may decrypt the attestation. The secure element 14 may validate the attestation as previously described. Additionally, this embodiment, the owner device 10 may communicate with the key tracking server 110 to check the CRL and may sign the sharing entitlements and the friend SE PK if validated successfully (arrows 112 and 114).

The secure element 14 may sign the friend SE PK and the sharing entitlements, and may encrypt the result using the session key. The secure element 14 may also encrypt the other tokens 52, as needed. The owner device 10 may transmit the encrypted data to the relay servers 142 using the URL and session ID. The friend device 12 may obtain the encrypted data and the secure element 16 may decrypt the data. The friend device 12 may transmit the access (friend SE PK and sharing entitlements signed by the KTS 110 and the owner SE 14, other tokens, etc.). The friend 42 may provide the pin (arrow 46), and the property 18 may validate the information and permit access based on the sharing entitlements in response to successful validation (arrow 118). Optionally, a sharing receipt may be provided as well (arrow 106).

The optimizations of FIGS. 9 to 11 may be applied to the embodiment of FIG. 12, in some embodiments. It is noted that, in some embodiments, each device OEM may have its own relay servers 142. Thus, when devices 10 and 12 are manufactured by different OEMs, different relay servers 142 may be contacted by the devices 10. Thus, there may be multiple transmissions of the encrypted data through multiple relay servers 142 between the devices 10 and 12, in some embodiments.

In some embodiments, the operating system that executes on the owner device 10 and/or the friend device 12 (outside of the secure elements 14 and 16) may be viewed as being someone secure and thus the operation may be described herein. In some embodiments, one or more servers may be used if the operating system is not viewed as very secure (e.g. the Android operating system, which is open source and thus not well controlled). The secure element 14 or 16 in a device having a somewhat insecure OS may have a link to the one or more servers, and the secure element 14 or 16 may validate access to the secure element 14 or 16 based on restrictions implemented by the servers. That is, the servers may communicate with the OS or application executing on the OS that is attempting to access the secure element 14 or 16 and may authenticate the application/insecure OS element and then permit the access. Alternatively, the secure elements 14 or 16 may only communicate with the servers, and the applications/OS elements executing on the device but outside the secure elements 14 or 16 may communicate with the servers to authenticate and obtain desired information.

Exemplary Mobile Device Implementation

Figure 13:
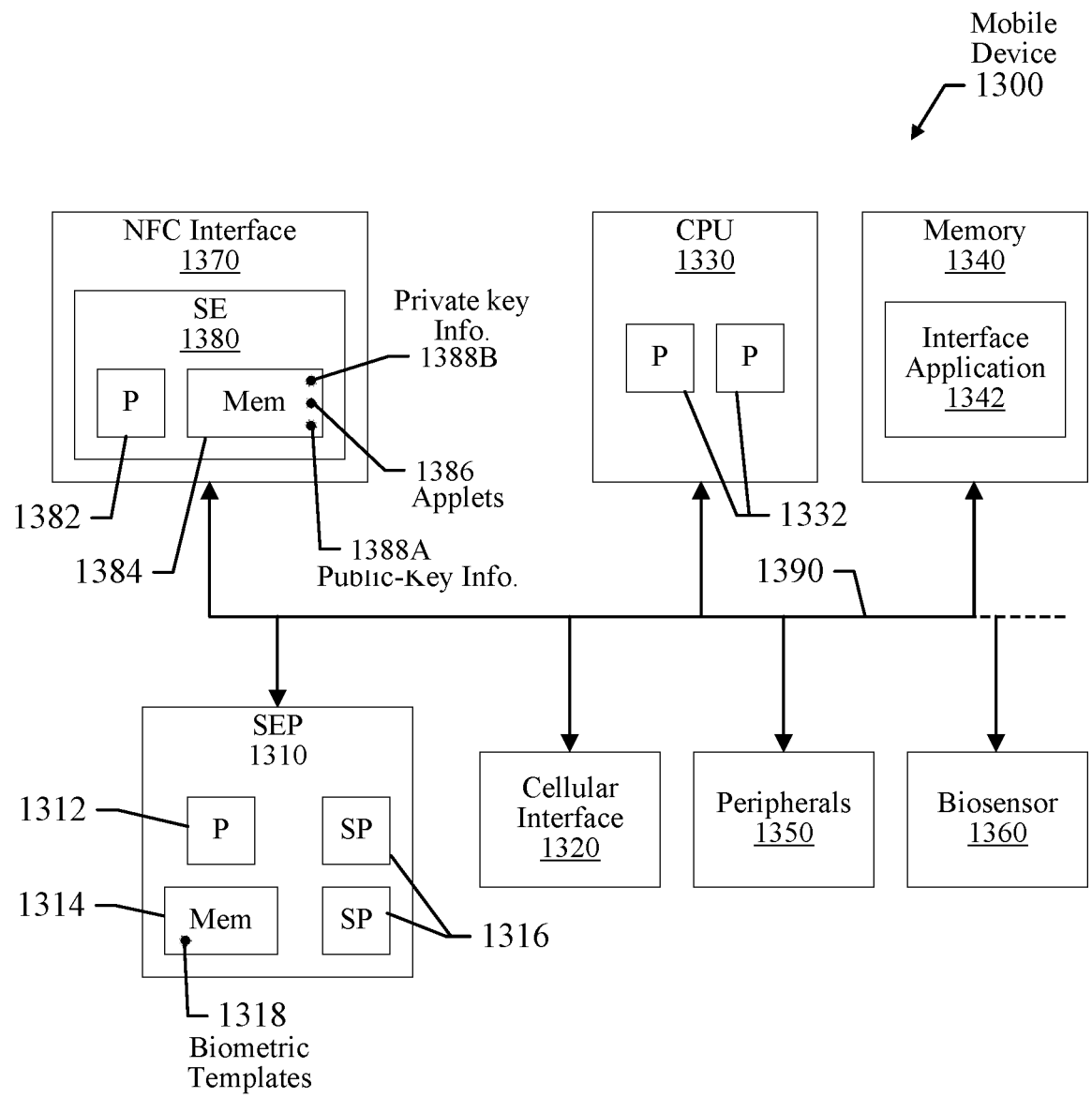
FIG. 13 is a block diagram illustrating one embodiment of an exemplary mobile device.

Turning now to FIG. 13, a block diagram of a mobile device 1300 is depicted, according to some embodiments. In some embodiments, mobile device 1300 may implement functionality described above with respect to devices 10 and 12. In the illustrated embodiments, mobile device 1300 may include a secure enclave processor (SEP) 1310, cellular interface 1320, CPU 1330, memory 1340, peripherals 1350, biosensor 1360, NFC interface 1370, and secure element 1380 coupled via a communication fabric 1390. As shown, SEP 1310 may include one or more processors P 1312, a secure memory 1314, and one or more security peripherals 1316. SE 1380 may include one or more processors P 1382 and a memory 1384. CPU 1330 may include one or more processors P 1332. Memory 1340 may store an interface application 1342. In some embodiments, mobile device 1300 may be implemented differently than shown.

In some embodiments, SEP 1310 is configured to maintain previously-captured biometric template data 1318 of one or more authorized users and compare it against newly received data captured by biosensor 1360 in order to authenticate a user. (In another embodiment, biosensor 1360 or SE 1380 may perform the comparison.) In the illustrated embodiment, SEP 1310 is configured to store biometric data collected from fingerprints, facial biometric data (e.g., iris data, voice data, facial or body characteristics), etc. in biometric templates 1318. In fingerprint embodiments, each template 1318 may correspond to a particular registered user and may be assigned a unique index value. In some embodiments, if biometric data received from biosensor 1360 matches the biometric data stored in a template 1318, SEP 1310 is configured to provide the unique index value associated with the matching template 1318 to SE 1380, which, in turn, uses the index value to look up the corresponding identification information for a known user being authenticated. In some embodiments, SEP 1310 may store multiple templates 1318. In various embodiments, communications between SEP 1310, SE 1380, and/or biosensor 1360 are encrypted such that another entity, such as CPU 1330, is unable to view their communications.

In various embodiments, SEP 1310 is configured to securely store biometric data. Accordingly, in various embodiments, SEP 1310 is isolated from the rest of the mobile device 1300 except for a carefully controlled interface (thus forming a secure enclave for SEP processor 1312, secure memory 1314, and security peripherals 1316). Because the interface to SEP 1310 is carefully controlled, direct access to SEP processor 1312, secure memory 1314, and security peripherals 1316 may be prevented. In one embodiment, a secure mailbox mechanism may be implemented. In the secure mailbox mechanism, external devices may transmit messages to an inbox. SEP processor 1312 may read and interpret the message, determining the actions to take in response to the message. Response messages from the SEP processor 1312 may be transmitted through an outbox, which is also part of the secure mailbox mechanism. Other circuitry may not be able to access internal resources of SEP 1310 other than via the mailbox mechanism. Other interfaces that permit only the passing of commands/requests from the external components and results to the external components may be used. No other access from the external devices to SEP 1310 may be permitted, and thus the SEP 1310 may be "protected from access." More particularly, software executed anywhere outside SEP 1310 may be prevented from direct access to the secure components with the SEP 1310. SEP processor 1312 may determine whether a command is to be performed. In some cases, the determination of whether or not to perform the command may be affected by the source of the command. That is, a command may be permitted from one source but not from another.

In various embodiments, SEP 1310 may be configured to perform functionality described with reference to SE 1380 and/or vice versa. In some embodiments, SE 1380 is configured to authenticate the identity of device 1300 while SEP 1310 is configured to authenticate the identity of a current user of device 1300 (which also may be required for system access, in some embodiments).

In some embodiments, SEP processor 1312 may execute securely loaded software that facilitates implementing functionality descried with respect to SEP 1310. For example, a secure memory 1314 may include software executable by SEP processor 1312. One or more of the security peripherals 1316 may have an external interface, which may be connected to a source of software (e.g. a non-volatile memory such as Flash memory). In another embodiment, the source of software may be a non-volatile memory coupled to another peripheral 1316, and the software may be encrypted to avoid observation by a third party. The software from the source may be authenticated or otherwise verified as secure, and may be executable by SEP processor 1312. In some embodiments, software may be loaded into a trust zone in memory 1314 that is assigned to the SEP 1310, and SEP processor 1312 may fetch the software from the trust zone for execution. The software may be stored in the memory 1340 in encrypted form to avoid observation. Despite the steps taken to ensure security of the secure software, the secure software may still be prevented from directly accessing/obtaining stored private keys. Only hardware may have access to private keys, in an embodiment.

Security peripherals 1316 may be hardware configured to assist in the secure services performed by SEP 1310. Accordingly, security peripherals 1316 may include authentication hardware implementing/accelerating various authentication algorithms, encryption hardware configured to perform/accelerate encryption, secure interface controllers configured to communicate over a secure interface to an external (to mobile device 1300) device, etc.

In some embodiments, SE 1380 may implement similar functionality as SEP 1310 in order to restrict access to confidential information stored in memory 1384 such as public-key information 1388A. For example, SE 1380 may implement a mailbox to restrict access to processor 1382 and memory 1384. In various embodiments, SE processor 1382 also executes securely loaded software in order to implement functionality described herein such as applets 1386 stored in memory 1384.

Applets 1386, in one embodiment, are executable to perform enrollment of mobile device 1300 and authentication with a reader. With respect to enrollment, applets 1386 may be executable to generate public-key pairs and obtain corresponding certificates, which may be stored in memory 1384 as public-key information 1388A and private key information 1388B.

Interface application 1342, in some embodiments, is executable to facilitate interfacing between SEP 1310, SE 1380, and a user of mobile device 1300 when enrollment and authentication are performed. Accordingly, application 1342 may provide various prompts to the user instructing the user to perform various actions during these processes. Application 1342 may also activate biosensor 1360, SEP 1310, and/or SE 1380 when appropriate during these processes. Various actions performed by application 1342 are described in further detail below.

Cellular Interface 1320, in some embodiments, is a long-range radio configured to facilitate interaction between mobile device 1300 and one or more external systems such as property 18, token server 24, key tracking server 110, and/or device OEM server 120. Cellular link 1320 may include suitable circuitry for interfacing with long-range networks such as a baseband processor, analog RF signal processing circuitry (e.g., including filters, mixers, oscillators, amplifiers, etc.), digital processing circuitry (e.g., for digital modulation as well as other digital processing), one or more antennas, etc. Cellular interface 1320 may be configured to communicate using any of multiple radio access technologies/wireless communication protocols such as GSM, UMTS, CDMA2000, LTE, LTE-A, etc.

As mentioned above, CPU 1330 may include one or more processors 1332. Generally, a processor may include circuitry configured to execute instructions defined in an instruction set architecture implemented by the processor. Processors 1332 may include (or correspond to) processor cores implemented on an integrated circuit with other components as a system on a chip (SOC) or other levels of integration. Processors 1332 may further include discrete microprocessors, processor cores and/or microprocessors integrated into multichip module implementations, processors implemented as multiple integrated circuits, etc.

Processors 1332 may execute the main control software of the system, such as an operating system. Generally, software executed by CPU 1330 during use may control the other components of the system to realize the desired functionality of the system. The processors may also execute other software. These applications may provide user functionality, and may rely on the operating system for lower-level device control, scheduling, memory management, etc. Accordingly, processors 1332 (or CPU 1330) may also be referred to as application processors. CPU 1330 may further include other hardware such as an L2 cache and/or an interface to the other components of the system (e.g. an interface to the communication fabric 1390).

Memory 1340 is a non-transitory computer readable medium and may generally include the circuitry for storing data. For example, memory 1340 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 1300 may include a memory controller (not shown) that may include queues for memory operations, for ordering (and potentially reordering) the operations and presenting the operations to the memory 1340. The memory controller may further include data buffers to store write data awaiting write to memory and read data awaiting return to the source of the memory operation. In some embodiments, the memory controller may include a memory cache to store recently accessed memory data. In some embodiments memory 1340 may include program instructions, such as instructions of application 1342 that are executable by one or more processors 1332 to cause device 1300 to perform various functionality described herein with respect to device 1300.

Peripherals 1350 may be any set of additional hardware functionality included in device 1300. For example, peripherals 1350 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 1350 may include audio peripherals such as microphones, speakers, interfaces to microphones and speakers, audio processors, digital signal processors, mixers, etc. Peripherals 1350 may include interface controllers for various interfaces including interfaces such as Universal Serial Bus (USB), peripheral component interconnect (PCI) including PCI Express (PCIe), serial and parallel ports, etc. Peripherals 1350 may include networking peripherals such as media access controllers (MACs). Any set of hardware may be included.

Communication fabric 1390 may be any communication interconnect and protocol for communicating among the components of device 1300. Communication fabric 1390 may be bus-based, including shared bus configurations, cross bar configurations, and hierarchical buses with bridges. Communication fabric 1390 may also be packet-based, and may be hierarchical with bridges, cross bar, point-to-point, or other interconnects.

Although FIG. 13 depicts components within mobile device 1300, it is noted that similar components may exist in computer systems used to implement other functionality described herein such as functionality described with respect to property 18, token server 24, key tracking server 110, and/or device OEM server 120. Accordingly, these systems may also include CPUs, memory, various network interfaces, and peripherals such as those described above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a first computing device having a first secure element circuit to cause the first computing device to perform operations comprising:
   receiving, from a second computing device associated with an owner of an electronically-secured property, an indication that the second computing device has transmitted a token to a server computing system, wherein the token permits a user of the first computing device to access the electronically-secured property, wherein the indication is not received via the server computing system;
   based on the received indication, sending a request for the token to the server computing system, wherein the request includes first information indicating that the first computing device includes the first secure element circuit;
   receiving the token, wherein receiving occurs after the server computing system has verified, using the first information, that the first computing device includes the first secure element circuit;
   securely storing the received token in the first secure element circuit of the first computing device; and
   transmitting the stored token from the first secure element circuit of the first computing device to the electronically-secured property to obtain access to the electronically-secured property based on the token.

2. The computer readable medium of claim 1, wherein the received indication includes a universal resource locator (URL) assigned by the server computing system to the token in response to the second computing device transmitting the token to the server computing system.

3. The computer readable medium of claim 2, wherein the received indication is a text message received by a messaging application of the first computing device.

4. The computer readable medium of claim 3, wherein the text message is directed to an identity associated with the first computing device, and wherein the identity includes a phone number.

5. The computer readable medium of claim 1, wherein the received indication includes a cryptographic key used by a second secure element circuit of the second computing device to encrypt the token, and
   wherein the operations further comprise:
      the first secure element circuit of the first computing device using the cryptographic key to decrypt the encrypted token.

6. The computer readable medium of claim 5, wherein the operations further comprise:
   the first secure element circuit sending a public key to the server computing system, wherein the server computing system is configured to use the public key to further encrypt the encrypted token; and
   the first secure element circuit using a private key to decrypt the further encrypted token.

7. The computer readable medium of claim 1, wherein the first information includes a public key maintained by the first secure element circuit, and wherein the operations further comprise: the first secure element circuit receiving, from the server computing system, a certificate issued for the maintained public key; and
   wherein the transmitting includes the first secure element circuit transmitting the issued certificate to the electronically-secured property to be permitted access to the electronically-secured property.

8. The computer readable medium of claim 7, wherein the first information includes a certificate chain for the public key maintained by the first secure element circuit.

9. The computer readable medium of claim 1, wherein the token is generated by the electronically-secured property.

10. The computer readable medium of claim 1, wherein the token is generated by a second secure element circuit of the second computing device.

11. A method, comprising:
generating, by an electronically-secured property, a token usable by a first computing device associated with an owner to share access to the electronically-secured property;
issuing, by the electronically-secured property, the generated token to the first computing device, wherein the first computing device is configured to transmit the token to a server computing system for storage and to transmit a corresponding indication of the storage to a second computing device, wherein the indication is not transmitted via the server computing system, wherein the second computing device is configured to:
after receiving the transmitted indication, retrieve the token from the server computing system using a set of information indicating that the second computing device includes a secure element circuit;
after the server computing system verifies the set of information, receive, from the server computing system, the token; and
securely store the retrieved token in the secure element circuit of the second computing device;
receiving, by the electronically-secured property, the securely stored token from the secure element circuit of the second computing device; and
permitting, by the electronically-secured property, access in response to a verification of the received token.

12. The method of claim 11, further comprising:
sending, by the electronically-secured property, a receipt to the first computing device in response to receiving the token from the secure element circuit of the second computing device.

13. The method of claim 11, wherein the set of information includes a public key of the secure element circuit, and wherein the permitting includes verifying the received token and a certificate received from the secure element circuit for the public key of the secure element circuit.

14. The method of claim 11, wherein the transmitted indication is a text message including 1) a universal resource locator (URL) assigned by the server computing system to retrieve the token and 2) a cryptographic key usable by the secure element circuit of the second computing device to decrypt the retrieved token.

15. The method of claim 11, wherein the electronically-secured property is a vehicle.

16. A first computing device, comprising:
a first secure element circuit;
a processor; and
memory having program instructions stored therein that are executable by the processor to cause the first computing device to perform operations comprising:
securely storing, in the first secure element circuit, a token that permits access to an electronically-secured property having an owner associated with the first computing device;
sending the token from the first secure element circuit to a server computing system for storage; and
sending, to a second computing device, an indication that the server computing system stores the token, wherein the indication is not sent via the server computing system, wherein, responsive to the indication, the second computing device is configured to retrieve the token using a public key of a second secure element circuit of the second computing device and to send the retrieved token from the second secure element circuit to the electronically-secured property to obtain access to the electronically-secured property.

17. The first computing device of claim 16, wherein the operations comprise:
in response to sending the token to the server computing system, receiving a universal resource locator (URL) assigned by the server computing system to the token; and
including the URL in the indication sent to the second computing device, wherein the URL is usable to retrieve the token from the server computing system.

18. The first computing device of claim 16, wherein the operations comprise:
prior to sending the token to the server computing system, the first secure element circuit encrypting the token with a cryptographic key; and
including the cryptographic key in the indication sent to the second computing device, wherein the cryptographic key is usable by the second secure element circuit of the second computing device to decrypt the encrypted token.

19. The first computing device of claim 16, wherein the operations comprise:
prior to securely storing the token in the first secure element circuit, receiving the token from the electronically-secured property.

20. The first computing device of claim 16, wherein, responsive to the indication, the second computing device is further configured to retrieve the token using a certificate chain for the public key of the second secure element circuit.

* * * * *